April 10, 1934. L. R. KRUPNICK ET AL 1,954,673
CAMERA FLASH LIGHT ATTACHMENT
Filed April 8, 1933
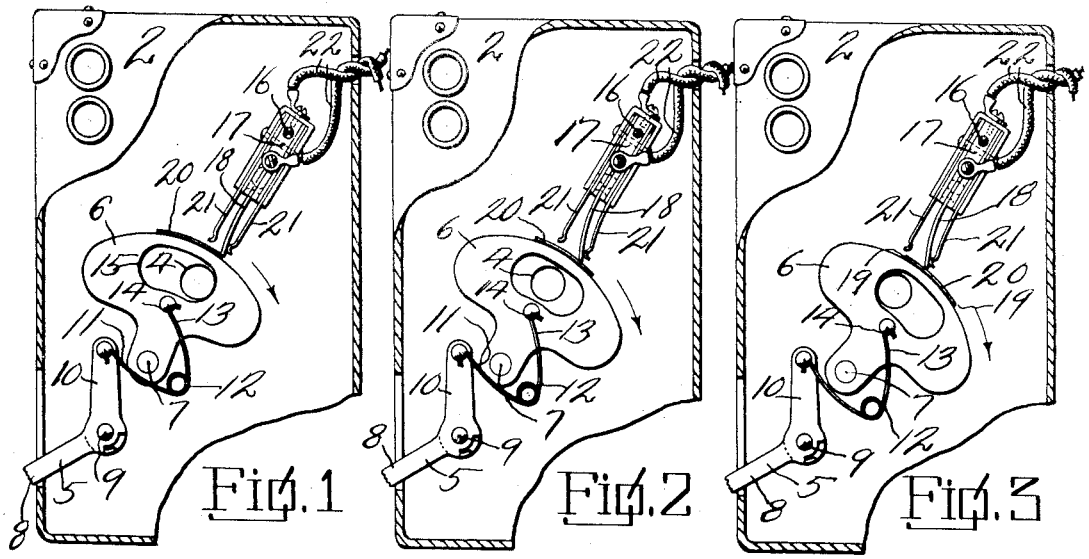
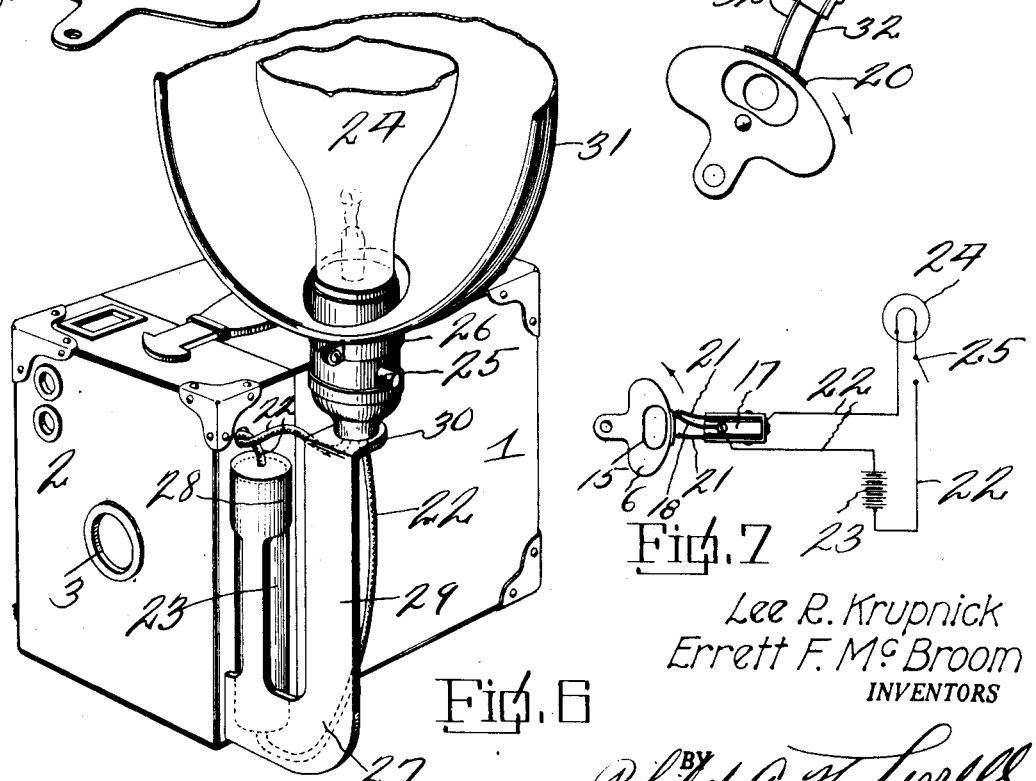
Lee R. Krupnick
Errett F. McBroom
INVENTORS
BY Philip A. H. Sewell
ATTORNEYS.

Patented Apr. 10, 1934

1,954,673

UNITED STATES PATENT OFFICE 1,954,673

CAMERA FLASH LIGHT ATTACHMENT

Lee R. Krupnick and Errett F. McBroom, Tulsa, Okla.

Application April 8, 1933, Serial No. 665,225

5 Claims. (Cl. 67—29)

The invention relates to flashlight attachments for cameras and has for its object to provide means whereby it will only be possible for the flashlight to operate upon the actual movement of the image aperture shutter to open position, thereby insuring a positive operation and preventing the loss of flashlight bulbs, which is now the common difficulty with devices of this general character, which are operated by other means than the shutter. Flashlight bulbs are generally only good for one exposure, hence the expense, if they are flashed when the shutter of the camera does not operate.

A further object is to provide a switch adjacent the shutter and closed only upon actual operation of the shutter for controlling the light circuit.

A further object is to mount the entire device on the camera.

A further object is to provide the shutter with a member cooperating with a switch element for closing a circuit to the flashlight upon operation of the shutter.

A further object is to provide a shutter with a means adjacent a leaf contact arm, flexibly movable between spring contact arms, said means being positioned whereby the leaf contact arm will be moved into engagement with either of the spring contact arms, according to the direction of movement of the shutter and maintained in contact during partial movement of the shutter in either direction.

A further object is to provide a supporting bracket on the camera and to provide said bracket with a recess for receiving a battery and with a supporting arm for supporting a switch socket and reflector for the flashlight.

A further object is to mount the flashlight in a switch socket which allows the circuit to be broken so that the flashlight will not operate when not needed, and particularly if the shutter should be worked accidentally, for instance, in transporting the camera, or when stored.

A further object is to provide means whereby the shutter on any type camera (box or folding) will form the means whereby the peak of the flash occurs at the maximum opening of said shutter.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a view in front elevation of a conventional form of camera with parts broken away and showing the shutter control switch therein in an intermediate position, and after the control lever has been forced downwardly for the shutter operation.

Figure 2 is a view similar to Figure 1 showing a further intermediate stage of the shutter movement.

Figure 3 is a view similar to Figure 1, showing the shutter in a further intermediate position and as it approaches its final closed position.

Figure 4 is a perspective view of the shutter, and circuit maker and breaker.

Figure 5 is a view in elevation of a modified form of circuit maker and breaker.

Figure 6 is a perspective view of a conventional form of camera, showing the flashlight and supporting means carried thereby.

Figure 7 is a diagrammatic view of the circuit and circuit maker and breaker.

Referring to the drawing the numeral 1 designates the main body of a conventional form of camera, and 2 the removable head portion carried thereby, and which head portion is provided with a conventional form of lens opening 3 in axial alinement with the usual image aperture 4.

In flashlight attachments for cameras at present constructed and are not shutter controlled, it is possible for the bulb to be flashed by the operation of the control lever 5 without the actual movement of the shutter 6, for instance when the shutter becomes stuck, and under these conditions, the flashlight being good for only one flash, there is a material loss.

Where the circuit is closed by the actual operation of the shutter 6, it is obvious that loss of bulbs will be positively obviated. Shutter 6 is pivotally mounted at 7, and is adapted to swing clockwise and counter-clockwise upon exposures and upon downward movement of the arm 8 of the lever 5, which is pivotally mounted at 9, and has connected to its arm 10 one of the arms 11 of the U-shaped spring 12. The other arms 13 of the spring 12 is connected at 14 to the shutter for succeeding exposures, therefore it will be seen that when the spring is tensioned the shutter will swing in one direction or the other, according to its position, and for moving the arcuate exposure aperture 15 across the image aperture, all of which structure is of conventional form. By referring to Figure 1 it will be seen that the lever has been forced down and the shutter 6 has made its initial movement to uncover the aperture 4, and as it continues its movement in the direction of the arrow *a* to the intermediate position shown in Figure 2, the aperture 4 continues uncovered. After the shutter 6 reaches the position shown in Figure 3, it is in a position to start the closure of the aperture 4 on the final movement of the shutter in the direction of the arrow in any of the figures under the influence of the spring. Upon the movement of the lever 5 in the opposite direction for the next exposure, that is in an upward position, the operation of the shutter is the same as above set forth, but in a reverse direction. Secured within the camera head 2 by means of screw 16 is an insulation block 17 having a leaf spring drag arm 18, which extends towards the shutter 6, and is adapted to be flexed in either direction according to the direction of movement of the shutter by the ends 19 of the arcuate shoe 20 carried by the shutter 6, and to drag over the shoe into immediate and continuous spring engagement with spring conductor arms 21, according to the direction of movement of the shutter. As the shutter 6 makes a complete exposure upon oscillation in one direction and a succeeding exposure upon an oscillation in the opposite direction, it will be seen that it will be necessary to complete a circuit and also break a circuit during each succeeding operation. When spring arm 18 engages either arm 21 according to direction of shutter movement, a circuit is closed over the wires 22 to the battery 23 and flashlight bulb 24, through the switch 25 when the switch 25 is closed; therefore, it will be seen that bulb 24 cannot be flashed except when the shutter 6 is actually moved, consequently loss of bulbs is prevented as well as the possibility of the bulb flashing with a corresponding film exposure, which is the common difficulty with devices of this character as at present constructed.

By providing the switch 25 in the lamp socket 26, it will be seen that when the switch 25 is open when the camera is being transported from place to place, accidental use of the flash bulb 24 is obviated. When it is desired to take a flashlight, the operator first closes the switch 25.

Extending outwardly from the side of the camera head 2 is a supporting bracket 27 having a socket 28 for the reception of the battery 23 as clearly shown in Figure 6. Bracket 27 is also provided with an upwardly extending arm 29 having an angularly disposed portion 30, on which the switch socket 26 is mounted, and which socket receives the flashlight bulb 24. Bulb and socket are provided with a reflector 31 which deflects light rays from the flashing operation forwardly, and at the same time protects the eyes of the operator from the intense light rays.

Referring to Figure 5 wherein a modified form of switch is shown; in this form the insulation block 17 has mounted on opposite sides thereof leaf switch blades 32, which are adapted to spring over the shutter shoe 20. In this form it will be noted that the circuit is closed through the shoe 20, using the shoe as a conductor. In both forms it is obvious that the shoe 20 may be arcuate or any other shape desired.

From the above it will be seen that a shutter controlled flashlight attachment is provided for cameras, which is simple in construction, positive in its operation and constructed in a manner whereby the loss of flashlight bulbs is obviated incident to the non-operation of the shutter proper of the camera. It will also be seen that the device is mounted on the camera head and can be removed therefrom with the camera head. It is a complete unit.

The invention having been set forth, what is claimed as new and useful is:

1. The combination with a camera shutter pivoted to a camera adjacent an exposure aperture and adapted to swing over said aperture in opposite directions for making a complete exposure upon each oscillation, switch actuating means carried by the shutter, of a switch carried by the camera on the opposite side of the exposure aperture from the pivotal point of the shutter and controlling a flash light circuit, said switch actuating means cooperating with the switch whereby exposures through the shutter will coincide with switch closing operations for successive exposures upon movement of the shutter in opposite directions.

2. The combination with a spring actuated camera shutter pivotally mounted on a camera at one side of an exposure aperture and having an elongated exposure aperture concentric with the exposure aperture of the camera, said shutter being adapted to oscillate in opposite directions for succeeding exposures, of a switch carried by the camera at the opposite side of the camera exposure aperture from the pivotal point of the shutter, an arcuate shoe carried by the shutter and cooperating with the switch whereby said switch is maintained closed as the shutter swings in opposite directions for successive exposures substantially during the entire periods of exposure of the camera aperture through the shutter aperture.

3. A device as set forth in claim 2 wherein the switch comprises a flexible contact arm adapted to be flexed and dragged over the shoe and contact arms on opposite sides of said flexible arm and adapted to be engaged by the flexible contact arm according to the direction of movement of the shutter.

4. A device as set forth in claim 2 comprising a flexible contact arm anchored adjacent the free end of the shutter, contact arms on opposite sides of the flexible contact arm and positioned whereby upon movement of the shutter in opposite directions for succeeding exposures said shoe will flex the flexible contact arm into engagement with either arm upon initial starting of exposure and according to the direction of movement of the shutter.

5. A device as set forth in claim 2 wherein the shoe extends beyond the end of the shutter, a leaf spring contact arm adapted to be flexed by said shoe in its movement in opposite directions for succeeding exposures and during the period of actual full exposure, contact arms on opposite sides of the spring contact arm and adapted to be engaged by the spring contact arm while in engagement with the shoe for maintaining a closed flashlight circuit.

LEE R. KRUPNICK.
ERRETT F. McBROOM.